(12) United States Patent
Placke et al.

(10) Patent No.: US 8,290,665 B2
(45) Date of Patent: Oct. 16, 2012

(54) METHOD FOR DRIVER SUPPORT

(75) Inventors: Lars Placke, Hannover (DE); Lars Biester, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 312 days.

(21) Appl. No.: 11/666,329

(22) PCT Filed: Sep. 8, 2005

(86) PCT No.: PCT/EP2005/054455
§ 371 (c)(1),
(2), (4) Date: Sep. 10, 2007

(87) PCT Pub. No.: WO2006/045667
PCT Pub. Date: May 4, 2006

(65) Prior Publication Data
US 2008/0065293 A1   Mar. 13, 2008

(30) Foreign Application Priority Data

Oct. 25, 2004   (DE) .................. 10 2004 051 963

(51) Int. Cl.
*G05D 1/00* (2006.01)

(52) U.S. Cl. ............... 701/43; 701/41; 701/44; 701/96; 701/301; 180/271; 180/272; 340/436; 340/437

(58) Field of Classification Search ............... 701/39, 701/41, 43, 44, 48, 71, 96, 300, 301; 180/271, 180/272; 340/436, 437
See application file for complete search history.

(56) References Cited

U.S. PATENT DOCUMENTS

| | | | |
|---|---|---|---|
| 5,774,069 A * | 6/1998 | Tanaka et al. | 340/903 |
| 6,424,895 B1 * | 7/2002 | Shimizu et al. | 701/41 |
| 6,449,572 B1 * | 9/2002 | Kurz et al. | 702/94 |
| 6,487,500 B2 * | 11/2002 | Lemelson et al. | 701/301 |
| 6,968,266 B2 * | 11/2005 | Ahmed-Zaid et al. | 701/96 |
| 7,206,697 B2 * | 4/2007 | Olney et al. | 701/301 |
| 2003/0093209 A1 * | 5/2003 | Andersson et al. | 701/93 |
| 2003/0128137 A1 * | 7/2003 | Hoetzel et al. | 340/932.2 |
| 2003/0191573 A1 * | 10/2003 | Beyer et al. | 701/70 |

FOREIGN PATENT DOCUMENTS

| | | |
|---|---|---|
| CN | 1291320 | 4/2001 |
| DE | 43 39 066 | 5/1995 |
| DE | 101 14 470 | 9/2002 |
| EP | 0 931 712 | 7/1999 |
| WO | WO 03/045726 | 6/2003 |
| WO | WO 03/055734 | 7/2003 |
| WO | WO 2004/007232 | 1/2004 |
| WO | WO 2004/025323 | 3/2004 |

* cited by examiner

*Primary Examiner* — Thomas Black
*Assistant Examiner* — Peter D Nolan
(74) *Attorney, Agent, or Firm* — Kenyon & Kenyon LLP

(57) ABSTRACT

A method for driver support in a vehicle in which a driver assistance system monitors a driving situation of the vehicle. Support takes place after a confirmation or after the absence of an abort instruction, a dialogue about the extent of support the driver wishes being conducted between the driver and the driver assistance system.

15 Claims, 2 Drawing Sheets

METHOD FOR DRIVER SUPPORT

BACKGROUND INFORMATION

Driver assistance systems are known which support a driver in steering a motor vehicle. Alerting systems in which sensors monitor the vehicle itself or the vehicle surroundings are known in this context. If a situation for which the driver is to be alerted is detected, a warning is output to the driver, acoustically or visually in particular. A driving action, i.e., a response to the warning, must be carried out by the driver himself. Also known are driver assistance systems in which driving actions are executed automatically after a driver assistance system has detected a corresponding situation which requires the driving action. For example, it is known in this context to carry out a velocity regulation automatically as a function of a distance from a vehicle traveling ahead. In addition, automatic parking devices which automatically guide a vehicle into a parking spot are known. In order to obtain automatic support, the driver must initially activate the system himself. The driver generally no longer has any influence on the subsequent automatic execution or may simply completely abort a corresponding automatically conducted regulation. Fixed function assignments for individual systems which, according to clear algorithms, show a system response as a function of different, stored parameters by taking statistical limiting values into account are generally provided for the evaluation of the vehicle's driving situation. If a calibration is carried out, this calibration generally remains in effect for the future.

SUMMARY OF THE INVENTION

The method for driver support according to the present invention has the advantage over the related art that a fixed function instruction for alerting or automatically responding driver functions is replaced by an adaptive response of the driver assistance system. A dialogue between the driver assistance system and the driver is carried out in order to make the adaptation possible. The driver assistance system recommends an action to the driver which it deems necessary within the scope of the present driving situation. However, this action is only executed as planned or carried out to conclusion when the driver either confirms the action or does not abort or correct the action. In contrast to a purely alerting system, the driver is now able via simple interaction to prompt the driver assistance system to carry out the necessary driving action itself. Conversely, the driver may intervene in the driving action with no problem when the instantaneous driving situation requires it or when the driving situation has not been properly detected by the driver assistance system.

If the driver wants to execute an action inappropriate for the overall situation, the driver assistance system may also override the driver, e.g., when the driver has not seen a vehicle detected in the blind spot and has initially not communicated that he is certain that there is no vehicle there, but he wants to leave the lane anyway. In this case, for example, the system maintains the position in the original lane, but may subsequently be overridden by the driver should he evaluate the situation as being safe, e.g., when he has communicated via eye contact with the driver of the vehicle situated in the blind spot about the lane change.

Operation of a driver assistance system is hereby made easy since a driver does not have to predefine parameters of the driver assistance system himself but may rather prompt the driver assistance system as a function of the instantaneous situation via a direct response to operate in a desired manner. The driver may arbitrarily choose between an automatic intervention and independent steering of the vehicle by the driver. Due to the dialogue, in which it is established who takes over the necessary substeps regarding steering of the vehicle, the driver may obtain assistance to an extent desired by him without having to input complex operating instructions for controlling the driver assistance system. This increases the willingness to accept support from a driver assistance system, which in turn contributes to an increase in traffic safety.

According to the present invention, cooperation between the driver and the driver assistance system is achieved in which both dynamically take over portions of an overall task in order to obtain an optimum result.

It is particularly advantageous to adapt a direction for the evaluation of the driving situation in the event of an input abort instruction. It is likewise advantageous to carry out an adaptation when the driver executes a driving action, which is relevant for the driver assistance system, but which the driver assistance system would not have recommended or would not have recommended in the executed manner. By modifying an evaluation of the driving situation as a function of the driver's response, a learning system may be created. Conversely, the driver may also learn by becoming more confident in parking operations, for example, when he is able to better estimate the vehicle dimensions himself. The learning system may adapt to the driver's driving style and may respond in the future in the manner desired by the driver; however, falling short or exceeding of safety-relevant limits, e.g., at selected velocities or distances to be taken into account, is to be avoided. It is preferred that the driver assistance system does not assume such exceeding of the limiting values as its own behavior. Irritation of the driver is thus reduced since he is able to better anticipate responses of the driver assistance system and the support by the driver assistance system corresponds more to his driving style, thereby further increasing the vehicle user's confidence in the driver assistance system. Moreover, the measuring tolerances of the driver assistance system may also be reduced by the learning process.

Furthermore, it is advantageous to limit the driver's options to abort the driving action in situations in which a driving action is considered necessary by the driver assistance system to avoid damage, because damage avoidance can only be in the driver's best interest. Such a situation, for example, may be present during an automatic brake application to prevent impact with an obstacle or in the event of an impending collision during a lane change.

Moreover, it is advantageous to also take the driver's condition into account in the driving situation. Alertness of the driver may be ascertained via objectively measurable values such as the skin resistance or the pulse frequency, or via eye blinking frequency values ascertained by a camera, via monitoring of the lane-keeping accuracy, or via monitoring of the operation of devices in the vehicle. If the level of alertness is low, the driver assistance system is more likely to take over tasks for the driver. For example, the driver is queried more noticeably whether he wants to take over a task or, if needed, the task may also be taken over automatically if the driver does not object, while, at high alertness, the driver would have to actively request the task.

It is particularly advantageous to make the evaluation of the driving situation and thus also the conclusions for driving actions to be carried out drawn from the evaluation dependent on the identity of the driver. A corresponding profile is preferably stored for each driver and updated during travel, so that each driver is provided with a desirable behavior of the driver assistance system. This profile may then be used to improve further cooperation between driver and driver assistance system.

It is further advantageous to obtain a confirmation of a driving action and/or abort instruction either from a direct input of the driver or from a steering instruction of the driver for steering the vehicle. This simplifies the dialogue between the driver and the driver assistance system since a short dialogue path between the driver and the driver assistance system is created. From the driver's response during steering of the vehicle itself it may advantageously be inferred in particular whether the driver agrees with the recommended driving action.

Furthermore, it is advantageous to take the driver's alertness into account when evaluating the driving situation. For example, warnings, information about driving actions to be executed, or similar outputs may be carried out earlier, if the driver is tired or inattentive for some other reason.

Use of the method according to the present invention is particularly advantageous in parking operations, passing maneuvers, or in cruise-controlled nose-to-tail driving since they are very complex driving operations for which approaches desired by drivers already exist for at least partial automation of the execution of the driving operation.

DETAILED DESCRIPTION

The method according to the present invention may include any driver assistance systems in a vehicle; only individual systems may be included which preferably cover the entire driver interaction according to the present invention. The driver assistance system may include parking aids in particular, which have steering support or engine support, in particular. In addition, a passing maneuver or nose-to-tail driving using a distance control and automatic cruise control adapted to the distance may be controlled using the method according to the present invention.

Figure 3:
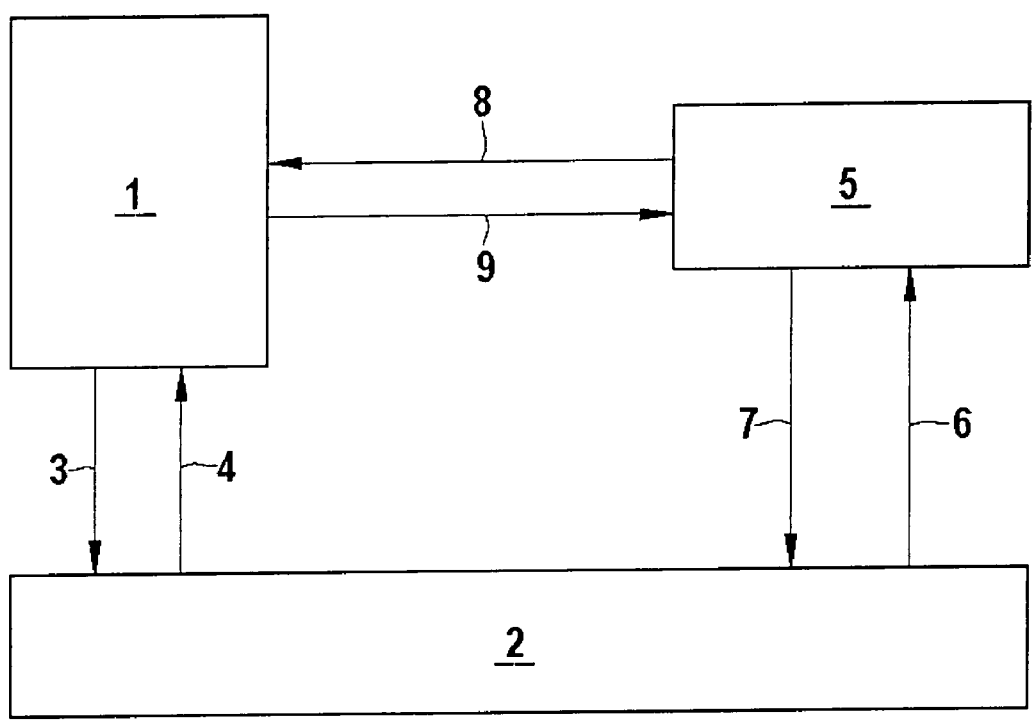
FIG. 3 shows a diagram of the interaction between the driver assistance system, the vehicle systems, and the driver.

The basic dialogue between the driver and an assistance system is represented in FIG. 3. Driver 1 is in a dialogue with vehicle control system 2. He may control the vehicle via user interventions 3 by inputting operating instructions in the vehicle. For example, the driver may turn the steering wheel, operate foot pedals, or switch control elements. Conversely, it is possible to display alert information to the driver via outputs 4 from the vehicle, e.g., in a central display unit in front of the driver. However, the driver may also receive haptic feedback. For example, the brake pedal may shake when the ABS system is activated or the driver may reach a stop of the steering at a maximum stop angle. A driver assistance system 5 also starts a dialogue with the actual vehicle control system 2. The instantaneous driving situation of the vehicle may be ascertained via a sensor query 6. The driver information system may respond to this by changing parameters of vehicle control system 2 via a controller 7.

According to the present invention, a direct dialogue between driver assistance system 5 and the driver also takes place. The driver is informed about a control measure to be carried out by the driver assistance system or already initiated by the driver assistance system via an output 8, for example. Via a response 9, driver 1 may communicate directly to the driver assistance system whether the recommended, initiated, or already started response to the detected driving situation should be continued, aborted, or corrected. The driver may thus decide whether he wants to leave control in the particular case to the driver assistance system or whether he wants to take over the action himself. Due to dialogue 8, 9, a decision may be made separately in each individual case.

Figure 1:
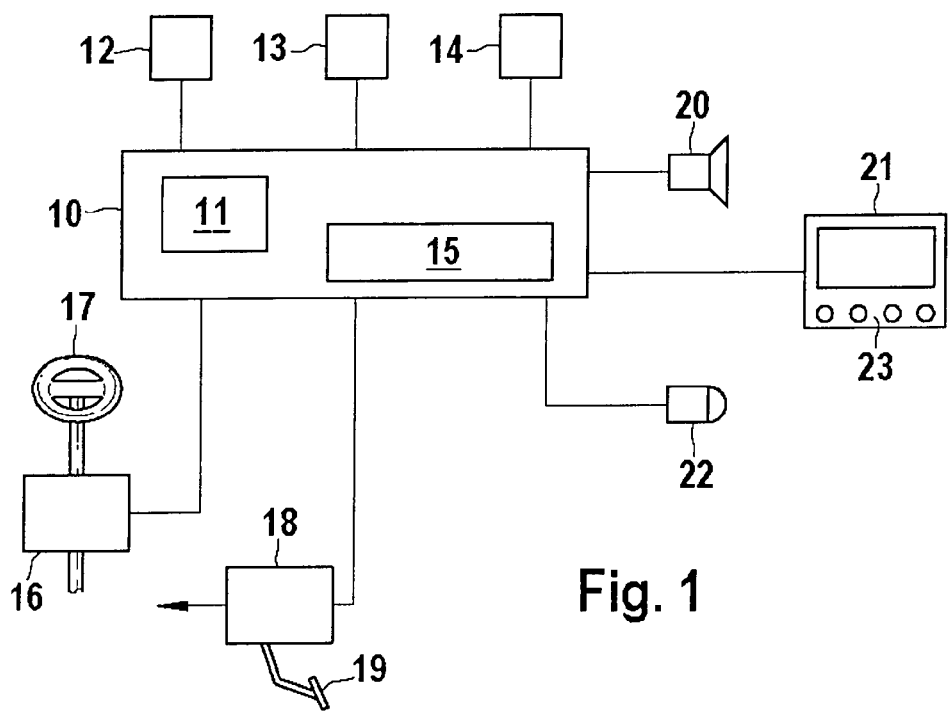
FIG. 1 shows an exemplary embodiment of a driver assistance system for executing the method according to the present invention.

FIG. 1 shows as an example a vehicle control system having a parking aid as a driver assistance system for executing the method according to the present invention. Driver assistance system 10 has a computer unit 11 which evaluates the instantaneous driving situation. For this purpose, driver assistance system 10 is connected to various sensors which detect the instantaneous driving situation. These may be distance sensors 12, for example, which are situated on the exterior contour of the vehicle. Distance sensors 12 are designed as ultrasound distance sensors, for example, and measure the distance to obstacles in the vehicle's surroundings. A speed sensor 13 which ascertains the instantaneous vehicle speed and conveys it to the driver assistance system may also be provided. Furthermore, a camera 14 which optically detects the vehicle surroundings may be provided. The data provided by sensors 12, 13, 14 is processed in computer unit 11 and analyzed with access to a memory unit 15. Limiting values for certain driving situations are stored in memory unit 15, for example. These may be minimum distances to obstacles in the vehicle's surroundings required in a parking aid in particular. Moreover, the vehicle's dimensions may also be stored and these may possibly depend on the current extra equipment, e.g., a mounted trailer hitch. Profiles for the respective drivers are preferably provided in memory unit 15. The distance selection, as well as the steering speed or the parking speed, and the parking confidence in the sense of driving skills may vary from driver to driver. How the support for the individual driver should take place, e.g., in the case of different distance values, may correspondingly be stored in memory unit 15.

In addition, driver assistance system 10 is provided with a powered steering control 16 via which an appropriate steering angle, predefined by driver assistance system 10, may be set in a powered manner. The driver may correct this steering angle, set with the aid of power, by operating steering wheel 17. Moreover, driver assistance system 10 is also connected to a brake controller 18. Operation of brake pedal 19 carried out by the driver may be detected, but it is also possible for the vehicle brakes, which are connected to brake controller 18 and are not shown in FIG. 1 for the sake of clarity, to be automatically operated via the driver assistance system and brake controller 18.

If after analysis of the data provided by sensors 12, 13, 14 the driver assistance system has ascertained a driving situation in which an intervention is deemed to be necessary, the user is informed about this intervention. For this purpose, the driver assistance system is connected to a loudspeaker 20 and/or a display unit 21, for example. If driver assistance system 10 determines, for example, that a driver is attempting to park in a parking spot which is rather tight, the following announcement may be output to the driver in a first embodiment via output units 20, 21: "Tight parking spot! Do you wish to have powered assistance?" The driver may now decide whether to leave automatic parking to driver assistance system 10 or whether he wants to execute the parking operation himself. The driver may communicate the intent to have the parking carried out automatically to the driver assistance system via a voice input into a microphone 22, for example. The driver speaks the command "please park" into the microphone, for example. Operating controls 23 which are situated, for example, at the display, at the steering wheel module, or at any other location on the dashboard may alternatively also be activated. A rejection is also detected, for example, when the driver begins driving into the parking spot. If the driver confirms the intent for automatic parking, the driver assistance system calculates a trajectory and automatically parks the vehicle in the parking spot by affecting the drive train and, in particular, the steering. However, the driver may always correctively intervene, an intervention being checked by the system and, if needed, the automatic parking operation being adapted to the input correction. In another embodiment, only steering may take place automatically while the driver still accelerates, brakes, and, if needed, changes the direction of travel via a corresponding gear selection.

If the driver does not wish any support, he is then only alerted about obstacles in the vehicle's surroundings. An intervention in the vehicle controller is initially omitted but will take place shortly before the driver collides with an obstacle. Similar to a "driving instructor/driving student" relationship, the driver may thus execute the parking operation himself but is still kept from sustaining damage. Such parking without any support may be sensible, for example, if a person partially blocked the parking spot during the first measurement by the driver assistance system so that the parking spot therefore appeared tighter to the system. The same could occur if a driver of a vehicle, which is parked adjacent to the parking spot, momentarily opened the door to get into the vehicle. In such an event, the driver is able to better judge that, after a short wait, for example, he may drive comfortably into a wide parking spot without any support. If the parking operation has already started, the driver may at any time abort or slightly correct the parking operation via intervention.

Figure 2:
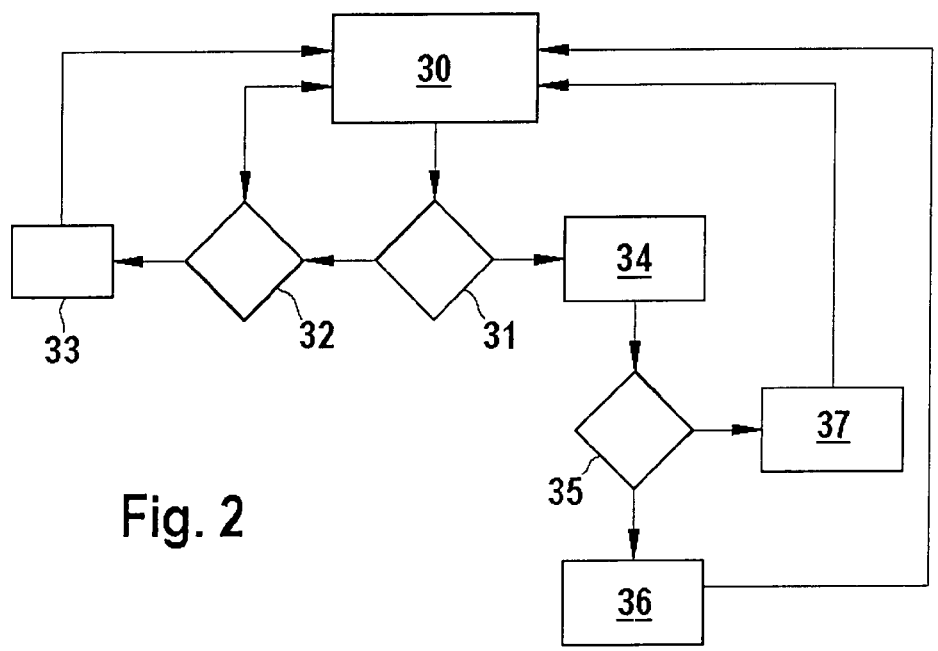
FIG. 2 shows a method sequence for an exemplary embodiment of a method according to the present invention.

An execution of the method according to the present invention is explained on the basis of FIG. 2. An instantaneous driving situation of the vehicle is initially ascertained in a sensing step 30. In a preferred embodiment, the driver's alertness is also ascertained, e.g., by checking the frequency of operating devices in the vehicle, e.g., a navigation device, from physical measured values of the driver, from his driving behavior, or by monitoring the driver's eyes. Moreover, speeds, distances to obstacles in the surroundings with the vehicle traveling or at a standstill, as well as other driving conditions, such as a slippery road surface, may be detected. Starting from sensing step 30, the method branches to a first test step 31. The driving situation is evaluated in the first test step and the evaluation, the identity of the driver, the driver's alertness, and the detected sensor data are taken into consideration to determine whether a driving action should take place. In this context a driving action means that a divergence should be made from simply following the road at a constant speed. A driving action may include a deceleration or an acceleration of the vehicle. A driving action may also include a steering intervention, i.e., turning the steering wheel left or right, which exceeds a simple correction of the straight-travel of the vehicle.

In the event that the instantaneous driving situation does not require such an assisting intervention after evaluation by the driver assistance system, the method branches to a second test step 32. It is checked in second test step 32 whether the driver himself carried out a corresponding driving action which would fall into the influence area of a driver assistance system. If no such action was present, the method branches back to sensing step 30 which is re-executed. However, if a driving action by the driver is detected, this driving action is compared to the corresponding situation in modifying step 33. If it is determined, for example, that during distance-controlled nose-to-tail driving a driver is keeping a greater safety distance from a vehicle traveling ahead than the driver assistance system would set, this value would then be corrected for the future to the adjustment actually carried out by the driver. This performed modification is stored in memory unit 15 and is thus available for further operation of driver assistance system 10. The modifying step 33 also branches back to sensing step 30.

If it is determined in first test step 31 that a driving action is required or is at least advisable, the method branches to an output step 34. In a first embodiment, the query whether the driver wishes for a certain driving action to take place, e.g., parking or a cruise control with respect to a vehicle traveling ahead, is output to the driver in output step 34. If the driver does not provide confirmation, automatic control is omitted. In another embodiment, the driver may also be informed that automatic control will take place if the driver does not input an abort instruction. In one embodiment, automatic support may initially start in a time-delayed manner, but may also start directly with the output of the query to the driver in output step 34. It is checked in a subsequent query step 35 whether the driver agrees with the recommendation by the driver assistance system or whether he rejects the recommendation. If he agrees with the recommendation, the method then branches to an automatic control step 36. The corresponding driving action is triggered by the driver assistance system. The method subsequently branches back to sensing step 30. If the user rejects the recommended action, the rejection is stored and evaluated in an evaluation step 37. If, for example, the driver rejects support multiple times, it will be subsequently recommended less frequently or not at all.

In a first embodiment, the method according to the present invention is executed constantly so that each driving situation in which the driver assistance system may support the driver is detected. However, in another embodiment, support by the driver assistance system may explicitly be requested by the user. The query, whether a measure should subsequently be implemented, is not affected by this.

However, in addition to the input over microphone 22, the driver may also prompt the driver assistance system through conclusive acting to execute a corresponding action. If, for example, the driver is looking for a free parking spot and the driver assistance system prompts him to stop and to properly turn the steering wheel, the driver may initiate the driver assistance system, through the deceleration of the vehicle and a slight turn of the steering wheel, to carry out the parking operation independently.

In a further embodiment, the method according to the present invention may be used for a passing maneuver on the highway. Without support by a driver assistance system, the driver has to handle a number of subtasks in such a passing maneuver. These include controlling the distance to the vehicle traveling ahead, decelerating or, if needed, accelerating the vehicle, monitoring the rear traffic, monitoring the driving maneuver of the vehicle traveling ahead, operating the turn signal, and guiding the vehicle's lateral travel. In addition, numerous decisions must be made, e.g., the decision to start the passing maneuver. According to the present invention, all or only a few of these tasks may either be supported or also taken over completely by the driver assistance system. However, the driver may handle any subtasks himself. According to the present invention, it is decided in each individual case who should carry out the respective subtask. The driver assistance system is initially calibrated on the basis of the history of the driving behavior. If the driver assistance system detected significant deceleration by the driver during a preceding passing maneuver, it will offer in the subsequent approach to a slower vehicle to indicate the right moment for starting the passing maneuver to the driver via a signal and to simultaneously monitor the rear traffic to prevent deceleration.

The system may alternatively also take over complete lateral control of the vehicle. For example, the offer may depend on how good the visibility is. In the event of heavy rain or when the driver is distracted by an auxiliary task, the takeover by the driver assistance system may be indicated visually or acoustically, for example, while in a situation with good visibility and high alertness of the driver, only an indication appears on the display. For example, the takeover of a subtask of the passing maneuver may be output to the driver by a short voice inquiry via loudspeaker 20. The driver responds to this by either accepting or rejecting, via microphone 22, for example, or via a push-button (not shown in the figure) which is situated on steering wheel 17, for example. Without reaching for another control element, the driver may indicate his agreement or rejection. If only the rear traffic is monitored, all other subtasks continue to be the responsibility of the driver. However, the driver may hand over a subtask to the driver assistance system via a certain voice instruction, or he may generally query which support is currently available. The support availability depends not only on the driving situation but also on the vehicle's technical equipment. After the driver has requested support and the system has offered support, he then may accept the support or may still reject it at this point.

What is claimed is:

1. A method for providing driver support in a vehicle, the method comprising:
    monitoring a driving situation of the vehicle using a driver assistance system;
    allowing a driver of the vehicle to selectably choose a level of support from the driver assistance program, wherein the driver assistance program is configured to at least one of intervene and alert the driver of the driving situation;
    evaluating the driving situation for determining a necessary driving action in relation to a plurality of driving parameters;
    communicating the necessary driving action to the driver of the vehicle through a visual display, spoken communication, and haptic feedback;
    ascertaining at least one of a confirmation and an abort instruction from at least one of a direct input by the driver and a control instruction of the driver for controlling the vehicle;
    automatically carrying out the necessary driving action after the confirmation, in the absence of the abort instruction, or until one of the abort instruction and a correction instruction is input directly to the driver assistance system, wherein in predetermined driving situations, in which ignoring or aborting the automatically carried out necessary driving action is dangerous, the driving action is automatically started or continued despite input of the abort instruction;
    assuming complete lateral control of the vehicle if the driver cedes control; and
    storing limiting values for the driving situation in a memory unit;
    wherein, when the abort instruction is input, a direction for evaluating the driving situation is adapted.

2. The method according to claim 1, wherein in the event of an action of the driver, without a control unit having ascertained a necessary driving action by the driver, a direction for evaluating the driving situation is checked and, if needed, corrected.

3. The method according to claim 1, wherein a condition of the driver is taken into account in the evaluation of the driving situation.

4. The method according to claim 1, wherein the driving situation is evaluated as a function of an identity of the driver.

5. The method according to claim 1, wherein an alertness of the driver is taken into account in the evaluation of the driving situation.

6. The method according to claim 1, wherein the method is used for one of parking the vehicle, executing a passing maneuver, and regulating a distance-controlled cruise control.

7. The method according to claim 1, further comprising:
    ascertaining at least one of the confirmation and the abort instruction from at least one of a direct input by the driver and a control instruction of the driver for controlling the vehicle, wherein the driving situation is evaluated as a function of an identity of the driver, and wherein an alertness of the driver is taken into account in the evaluation of the driving situation.

8. The method according to claim 1, wherein an alertness of the driver is taken into account in the evaluation of the driving situation, and wherein the evaluating of the driving situation of the vehicle includes its surroundings.

9. The method according to claim 1, wherein the driver may prompt the driver assistance system through conclusive acting to execute a corresponding action.

10. A device for providing driver support in a vehicle, comprising:
    a monitoring arrangement to monitor a driving situation of the vehicle using a driver assistance system;
    a selecting arrangement to allow a driver of the vehicle to selectably choose a level of support from the driver assistance system, wherein the driver assistance program is configured to at least one of intervene and alert the driver of the driving situation;
    an evaluating arrangement to evaluate the driving situation for determining a necessary driving action in relation to a plurality of driving parameters;
    a communicating arrangement to communicate the necessary driving action to the driver of the vehicle, and to visually display information to the driver, communicate verbally, or provide haptic feedback;
    a control arrangement to automatically perform the necessary driving action after confirmation, in the absence of an abort instruction, or until one of the abort instruction and a correction instruction is input directly to the driver assistance program, the control arrangement assuming lateral control of the vehicle if the driver cedes control of the vehicle, wherein in predetermined driving situations, in which ignoring or aborting the automatically carried out driving action is dangerous, the necessary driving action is automatically started or continued despite input of the abort instruction; and
    a memory unit for storing limiting values for each driving situation and for storing a profile containing preferences for each driver;
    wherein, when the abort instruction is input, a direction for evaluating the driving situation is adapted.

11. The device according to claim 10, wherein the monitoring arrangement includes a plurality of distance sensors, wherein the control arrangement includes a parking aid program, and wherein the communicating arrangement includes at least one of a microphone for the driver to communicate with the driver assistance program, a speaker for communicating with the driver, and a display unit to display information to the driver.

12. The device according to claim 10, wherein the monitoring arrangement includes a plurality of speed sensors, wherein the control arrangement includes a parking aid program, and wherein the communicating arrangement includes at least one of a microphone for the driver to communicate with the driver assistance program, a speaker for communicating with the driver, and a display unit to display information to the driver.

13. A device for providing driver support in a vehicle, comprising:
   a monitoring arrangement to monitor a driving situation of the vehicle using a driver assistance system;
   a selecting arrangement to allow a driver of the vehicle to selectably choose a level of support from the driver assistance system, wherein the driver assistance program is configured to at least one of intervene and alert the driver of the driving situation;
   an evaluating arrangement to evaluate the driving situation for determining a necessary driving action in relation to a plurality of driving parameters;
   a communicating arrangement to communicate the necessary driving action to the driver of the vehicle, and to visually display information to the driver, communicate verbally, or provide haptic feedback;
   a control arrangement to automatically perform the necessary driving action after confirmation, in the absence of an abort instruction, or until one of the abort instruction and a correction instruction is input directly to the driver assistance program, the control arrangement assuming lateral control of the vehicle if the driver cedes control of the vehicle, wherein in predetermined driving situations, in which ignoring or aborting the automatically carried out driving action is dangerous, the necessary driving action is automatically started or continued despite input of the abort instruction; and
   a memory unit for storing limiting values for each driving situation and for storing a profile containing preferences for each driver;
   an ascertaining arrangement to ascertain at least one of the confirmation and the abort instruction from at least one of a direct input by the driver and a control instruction of the driver for controlling the vehicle;
   wherein:
      the driving situation is evaluated as a function of an identity of the driver,
      an alertness of the driver is taken into account in evaluating the driving situation,
      a direction for evaluating the driving situation is adapted when the abort instruction is input,
      for an action of the driver, without a control unit having ascertained a necessary driving action by the driver, the direction for evaluating the driving situation is checked and is corrected if necessary, and
      a condition of the driver is taken into account in the evaluation of the driving situation.

14. A method for providing driver support in a vehicle, the method comprising:
   monitoring a driving situation of the vehicle using a driver assistance system;
   allowing a driver of the vehicle to selectably choose a level of support from the driver assistance program, wherein the driver assistance program is configured to at least one of intervene and alert the driver of the driving situation;
   evaluating the driving situation for determining a necessary driving action in relation to a plurality of driving parameters;
   communicating the necessary driving action to the driver of the vehicle through a visual display, spoken communication, and haptic feedback;
   ascertaining at least one of a confirmation and an abort instruction from at least one of a direct input by the driver and a control instruction of the driver for controlling the vehicle;
   automatically carrying out the necessary driving action after the confirmation, in the absence of the abort instruction, or until one of the abort instruction and a correction instruction is input directly to the driver assistance system, wherein in predetermined driving situations, in which ignoring or aborting the automatically carried out necessary driving action is dangerous, the driving action is automatically started or continued despite input of the abort instruction;
   assuming complete lateral control of the vehicle if the driver cedes control; and
   storing limiting values for the driving situation in a memory unit;
   wherein:
      a direction for evaluating the driving situation is adapted when the abort instruction is input,
      for an action of the driver, without a control unit having ascertained a necessary driving action by the driver, the direction for evaluating the driving situation is checked and is, if needed, corrected, and
      a condition of the driver is taken into account in the evaluation of the driving situation.

15. A method for providing driver support in a vehicle, the method comprising:
   monitoring a driving situation of the vehicle using a driver assistance system;
   allowing a driver of the vehicle to selectable choose a level of support from the driver assistance program, wherein the driver assistance program is configured to at least one of intervene and alert the driver of the driving situation;
   evaluating the driving situation for determining a necessary driving action in relation to a plurality of driving parameters;
   communicating the necessary driving action to the driver of the vehicle through a visual display, spoken communication, and haptic feedback;
   ascertaining at least one of a confirmation and an abort instruction from at least one of a direct input by the driver and a control instruction of the driver for controlling the vehicle;
   automatically carrying out the necessary driving action after the confirmation, in the absence of the abort instruction, or until one of the abort instruction and a correction instruction is input directly to the driver assistance system, wherein in predetermined driving situations, in which ignoring or aborting the automatically carried out necessary driving action is dangerous, the driving action is automatically started or continued despite input of the abort instruction;
   assuming complete lateral control of the vehicle if the driver cedes control; and
   storing limiting values for the driving situation in a memory unit;

ascertaining at least one of the confirmation and the abort instruction from at least one of a direct input by the driver and a control instruction of the driver for controlling the vehicle;

wherein:

the driving situation is evaluated as a function of an identity of the driver, an alertness of the driver is taken into account in evaluating the driving situation, a direction for evaluating the driving situation is adapted when the abort instruction is input, for an action of the driver, without a control unit having ascertained a necessary driving action by the driver, a direction for evaluating the driving situation is checked and is corrected if necessary, and a condition of the driver is taken into account in the evaluation of the driving situation.

* * * * *